July 26, 1938.   G. A. STACKHOUSE   2,124,641
SPRING STRUCTURE
Filed June 22, 1936

INVENTOR.
George A. Stackhouse
BY
Chappell, Carl T Chappell
ATTORNEYS

Patented July 26, 1938

2,124,641

UNITED STATES PATENT OFFICE 2,124,641

SPRING STRUCTURE

George A. Stackhouse, Oakland, Calif., assignor to L. A. Young Spring and Wire Corporation, Detroit, Mich.

Application June 22, 1936, Serial No. 86,606

2 Claims. (Cl. 5—266)

The main objects of this invention are:

First, to provide a spring structure adapted for use in beds, chairs, chesterfields and other analogous connections, which is of a greatly improved resiliency and universality of action and at the same time very durable.

Second, to provide a structure of the type described, which is characterized by its simplicity and resultant economy of production.

Third, to provide a device which embodies the resilience and universality recited above without the sacrifice of any measure of its sturdiness.

Fourth, to provide a coil spring support comprising a pivoted link arrangement.

Further objects relating to details and economies of the invention will appear from the description to follow. The invention is defined in the claims.

A preferred embodiment of the invention is illustrated in the accompanying drawing, wherein.

Figure 1:
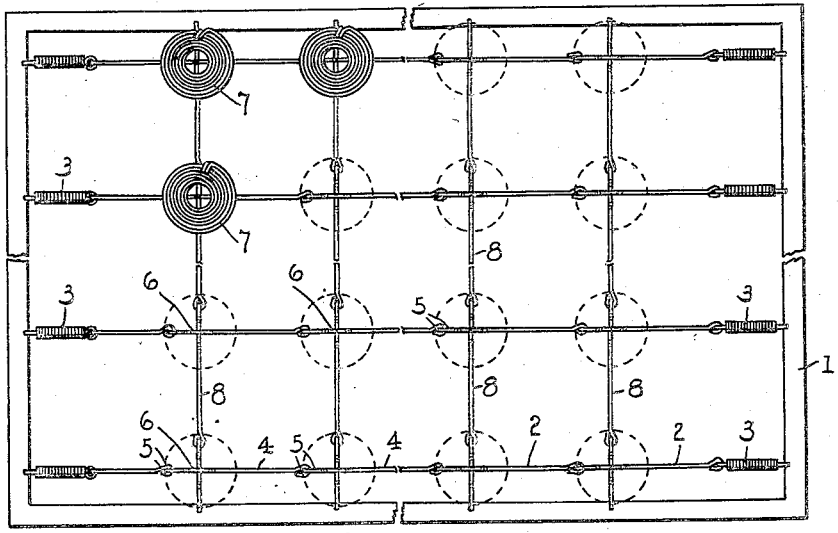
Fig. 1 is a fragmentary plan view of an assembly of the structure of my invention.

Referring to the drawing, my spring structure comprises a framework 1 which is rectangular or of any desired shape on which are mounted a plurality of spring supporting members generally designated by the numeral 2 and strung in the direction of one dimension of the frame and joined at their ends to the frame by coil springs 3.

The supports 2 consist of a series of links 4 which are articulated at their ends by loops or hooks 5. Extending in the other direction of the frame and transverse to the support members 2 are similar support members generally designated by the numeral 8 and likewise consisting of a series of links 4 articulated in a manner similar to that characterizing the first series. The transverse support members are shown as being joined to the frame 1 by the hooks at the ends thereof. However, it will be appreciated that in the case of the transverse members springs 3 may likewise be used to effect the connection with the frame.

Figure 2:
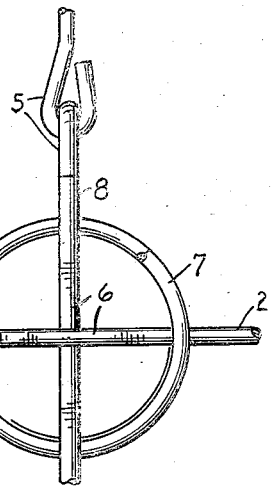
Fig. 2 is an enlarged fragmentary view on a line corresponding to line 2—2 of Fig. 3 illustrating details of the spring supports and the mounting of the springs thereon.
Figure 3:
Fig. 3 is a fragmentary view partially in section, illustrating the manner of assembling a coil spring with the link support construction of my invention.
Figure 3:
Figure 3:
Figure 3:
Figure 3:
Figure 3:
Figure 3:

At their points of intersection, the links 4 are mutually offset or crimped away from one another as indicated at 6, for the purpose of maintaining the general link structure in a single plane as well as to locate the upwardly extending coil springs 7 and to enable the lowermost coil of the coil springs to be interlaced with the links in the manner illustrated in Fig. 2. The crimps or offsets 6 are formed in links 4 closely adjacent to an end of the links or to the hook 5. That is, the offsets at the points of intersection of the links are spaced substantially from the middle of the links so as to minimize bending at the offsets and prevent breakage of the links. The upper ends of the coil springs are joined as desired in a conventional manner which is of no importance in connection with the present invention.

By the structure outlined in the foregoing description, I have provided a spring assembly which is unusually resilient and universal in its action. So far as I am aware, I am the first to conceive the idea of joining the upright coil springs by means of articulated links rather than by continuous transverse and longitudinal members. This provides a strong flexible support for the springs in which each spring is flexibly connected to every other spring in the assembly and at the same time they are maintained in upright position. Further, the strain on the supports is minimized inasmuch as there are no severe bending stresses thereon.

The offsets 6 are further of special importance in connection with the link element construction in view of the fact that the greatly increased rocking and resiliency made possible by that construction demands improved means for locating and securing the upright coil springs. The provisions as described fulfill these requirements admirably.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a spring structure, a supporting frame, a plurality of intersecting support members strung across said frame, said members comprising a series of wire links articulated by hooks at the ends of said links, each link intersecting not more than one other link and the points of intersection of the links being spaced substantially from the middle of the respective links, said intersecting links being offset from one another at the points of intersection to locate and support coil springs at said points, whereby bending at the offsets is minimized.

2. In a spring structure, a plurality of pairs of links, each link intersecting one other link only, the links of each pair intersecting at a point spaced substantially from the middle of at least one of the links of the pair, the links being mutually offset at the points of intersection to provide spring supporting seats for locating and supporting coil springs arranged at right angles to the plane of the links, the arrangement of the offsets at points spaced from the link ends serving to minimize bending at the offsets, and means for supporting the links at the ends thereof.

GEORGE A. STACKHOUSE.